Oct. 3, 1939.  M. A. BERG  2,174,772
BUTTER CUTTER
Filed Sept. 13, 1937
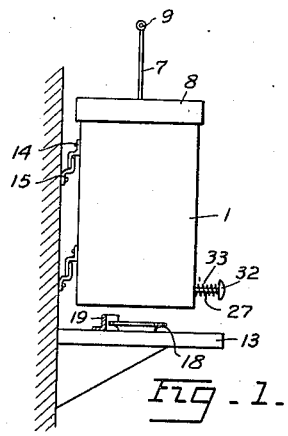
Fig. 1.
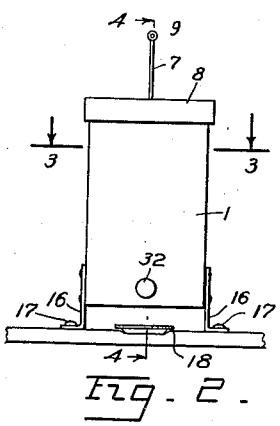
Fig. 2.
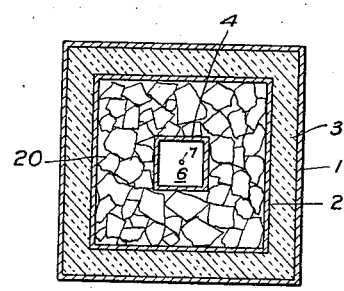
Fig. 3.
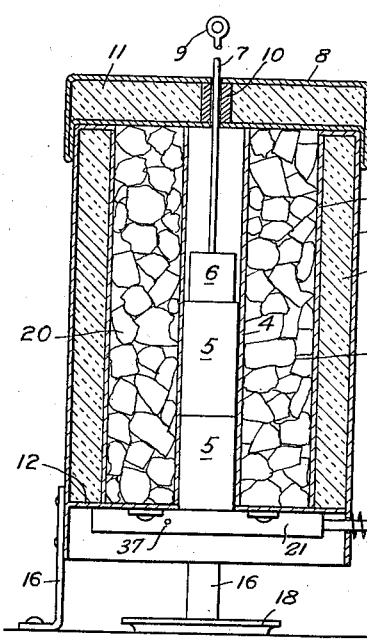
Fig. 4.
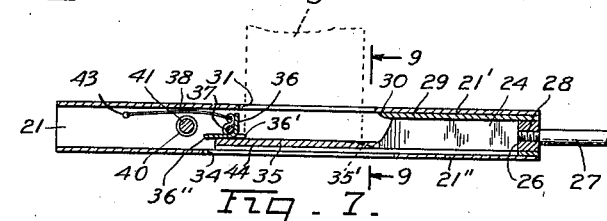
Fig. 7.
Fig. 8.
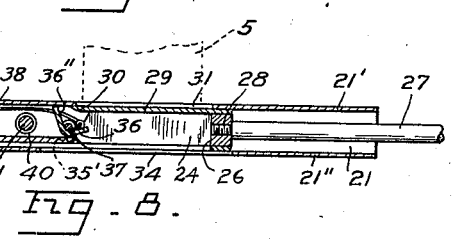
Fig. 9.
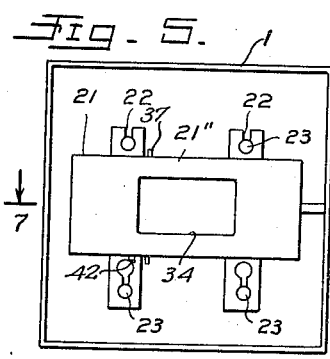
Fig. 5.
Fig. 6.
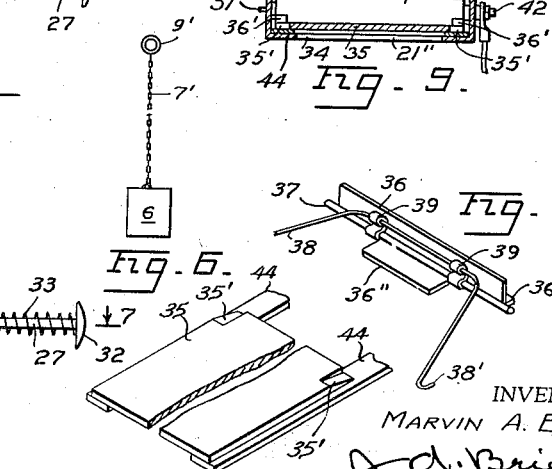
Fig. 10.
Fig. 11.
INVENTOR.
MARVIN A. BERG
J. A. Bried
ATTORNEY.

Patented Oct. 3, 1939

2,174,772

UNITED STATES PATENT OFFICE 2,174,772

BUTTER CUTTER

Marvin A. Berg, Vallejo, Calif.

Application September 13, 1937, Serial No. 163,574

3 Claims. (Cl. 31—21)

This invention relates to apparatus for cutting butter into small pats for depositing on butter dishes for serving on the table.

The object of the invention is to provide a simple, reliable device into which the standard oblong, rectangular section of butter may be placed, and by simple manipulation, the device will slice off and deliver the desired pat on the butter shell.

Another object of the invention is to provide such a device which will keep the butter chilled so that it will be sliced easily and deliver pats with sharp outlines.

Another object is to provide such an apparatus which will automatically show how much butter is still in the container.

Another object is to provide means adjacent the butter slicing device to prevent sticking of the sliced pat within the slicer, and also to forcibly eject the same.

Still another object is to provide apparatus of this kind which may be quickly disassembled for washing so as to preserve the same in sanitary condition.

Other objects and advantages of the invention will appear in the following description and accompanying drawing.

In the drawing:

Figure 1 is a side elevation of one form of my apparatus shown suspended in a pair of brackets from a wall and overhanging a shelf upon which the butter shells are placed to receive the butter pats discharged below the machine.

Figure 2 is a front view of an apparatus like that of Figure 1, except that it is supported on legs on the shelf upon which the butter shells are placed.

Figure 3 is an enlarged cross section of Figure 2 taken along the line 3—3 of Figure 2.

Figure 4 is an enlarged vertical central section through the apparatus as seen from the line 4—4 of Figure 2 showing the sections of butter within and a weight above pressing them down upon the slicer.

Figure 5 is a bottom view of Figure 4.

Figure 6 is a detached view showing a weight suspended on a chain in place of the rod shown in Figure 4.

Figure 7 is an enlarged vertical section through the slicer as taken along the line 7—7 of Figure 5, and showing the butter section in position preparatory to slicing off the pat therefrom.

Figure 8 is a view similar to that of Figure 7 but showing the slicer positioned inwardly after severing the pat and the position of the ejector after having forced the pat outward or downward to fall upon the butter shell.

Figure 9 is a cross section of the slicer as seen from the line 9—9 of Figure 7.

Figure 10 is a perspective view of the device which forms a stop and ejector for the butter pats as they are sliced off.

Figure 11 is a perspective view of the bottom plate of the slicer.

Briefly stated, the invention comprises a heat insulated container with a centrally disposed tubular guide into which one or more elongated rectangular standard sections of butter (generally called a cube of butter) are dropped, and held down by a weight riding on top. The container is supported a sufficient distance above a shelf or table so that a butter shell, or a series of shells may be successively passed below it.

The sections or cubes of butter within the vertical guide rest on a reciprocable slicer which is normally held outward in released position by a spring and is provided with a knob for pushing it in manually each time it is desired to slice off a pat of butter and drop it onto the butter shell.

In the drawing 1 indicates an outer container, 2 an inner container spaced therefrom and packed between with a heat insulating substance 3 such as mineral wool, or other accepted material for this purpose.

Spaced a relatively large distance within the inner container 2 is the vertical guiding tube 4 which loosely receives the butter cubes or sections 5, and which are pushed down by the weight 6 which is here shown as secured in the lower end of a rod 7 passing through the lid 8 of the device and provided with a ring or ball 9 screwed or otherwise detachably secured to the upper end of the rod 7. The rod passes loosely through a filler block, preferably of wood, 10 in the lid 8, and the lid itself is formed with a hollow space which is also filled with heat insulating material 11 corresponding to the walls of the container. The lower part of the container is closed by a wall 12 spaced somewhat above the lower edge of the container so as to conceal the slicing mechanism to be described, and the container is preferably supported above a shelf or table 13, either as by hooks 14 engaging brackets 15, secured to the walls, or supported on legs 16 as shown in Figures 2 and 4, and which legs would, of course, be secured to the table or shelf as at 17 to hold the container in fixed position for operation.

It is desirable, though not absolutely necessary, to provide some means for centering the butter shells 18 when placed in position under the container 1, and such means is represented in Figure 1 by a suitable guide 19 secured to the shelf 5 and which it is manifest may take any form depending on whether the shells are inserted one at a time from the front of the container, or whether they are slid along the shelf in succession under and past the container.

The space between the vertical butter guiding tube 4 and the inner container 2 is adapted for filling with crushed ice 20 to keep the butter chilled, or if desired, any other suitable cooling system may be used therein.

At the under side of the bottom plate 12 of the container is slidably supported a special slicer which includes a frame 21 preferably detachably positioned against the bottom of plate 12 as by slots 22 engaging fixed rivet heads 23 projecting from the container bottom 20, so as to permit almost instant removal of the frame and its slicing mechanism from the apparatus for cleaning when not in use.

The frame 21, made of sheet metal, is of rectangular cross section as shown in Figure 9, and slidably supported within it is a slicer which is also of rectangular form and made of sheet metal, and which includes side walls 24, a part bottom wall 35, a front end wall 26 to which a push rod 27 is threadedly secured as at 28, and a top wall or cutter blade 29 having a sharpened forward edge 30, and a marginal strip or runner 44 which extends the length of the slicer.

Cutter blade 29 lies closely beneath the upper wall 21' of frame 21, and when in initial or starting position as shown in Figure 7, the cutting edge 30 of the blade lies adjacent an opening 31 in the plate 21', and which opening 31 coincides with a similar opening in the bottom 12 of the container 1 at the lower end of the butter guiding tube 4.

Rod 27 projects slidably through an opening in the front wall of container 1 and is provided at its end with a knob or button 32 against the inner side of which a compression spring 33 coiled around the rod reacts to force the rod outward from the casing 1 and thus retract the slicer to the position shown in Figure 7.

The under plate 21'' of the slicer frame 21 is provided with a large discharge opening 34 through which the butter may fall when sliced off by the blade 29, but the slicer itself is provided with the plate 35 substantially covering this opening and normally supporting the lower end of the butter cube 5 when the slicer is in retracted position as shown in Figure 7, so that upon the slicer being pushed inwardly by pressure upon the knob 32, the blade 29 will cut a slice off the bottom of the part corresponding to the spacing of the cutter blade 29 above the supporting plate 35.

To prevent the sliced off pat from following the movements of the slide to the left a stop is provided. This stop takes the form of a plate 36 which normally extends at right angles inside of and across the frame 21 and is of a size to pass over plate 35 of the slicer and under its blade 29 when the slicer is pushed inwardly. Plate 36 is pivotally mounted on a small shaft 37 which extends through the sides of the frame 21 and the plate 36 is normally pushed forward, or that is in a direction to rotate clockwise about the axis of shaft 37, as viewed in Figure 7 to the position shown in Figure 8, by a thin wire spring 38 which is secured at its end or ends to the sides of frame 21 as by forming hooks 38' at its ends which are hooked through holes 43 in sides 21 of the frame and which spring bears at its intermediate portion against the rear of plate 36 so as to urge it in the direction indicated, the wire being substantially positioned with reference to plate 36 by one or more clips as at 39 formed integrally from the plate 36 as clearly indicated in Figure 10.

To normally hold the plate 36 vertically, as shown in Figure 7, during the cutting of the butter slap or pat from the block or section 5, plate 36 is provided with two forwardly bent portions 36' which ride on the lower plate 35 of the slicer, and which plate 35 is grooved at 35' at opposite edges to permit the projections 36' of plate 36 to swing downwardly just as the cutter 29 finishes its work, so that the main portion 36 will tip downwardly as it were and force the cut pat of butter down and out of the opening 34. Upon return movement of the slicer through the action of spring 33, members 36' ride upward in grooves 35' to their original positions; and to prevent plate 36 going backward beyond the vertical, it is provided with a rearwardly extending portion or lock 36'', which rides on plate 35 at the opposite side of pivot 37.

In the operation of the device a gradual accumulation of butter, even though quite slight upon the face of plate 36 tends to make the pieces stick instead of discharging readily therefrom upon tipping forward of the plate in the manner described, and to avoid which I provide a gentle electric heating coil 40 which extends transversely of frame 21 adjacent the rear of plate 36 to give it just sufficient warmth to avoid the objectionable action mentioned. This coil is mounted on an insulating rod 41 suitably supported at its ends by side walls 21 and is fitted at one end with suitable connections 42 to which an electric cord may be connected from any suitable source of current.

In operation the waiter desiring butter for serving to a customer slides the butter shell under the apparatus, gives a quick push on knob 32 and instantly the sliced-off pat falls onto the shell.

As the butter pats are successively cut from the cubes or blocks 5, the ball or ring 9 on the upper end of the weight rod 7 will slowly lower until the supply of butter is exhausted when the ring will touch the top of the cover 8. Hence the position of this ring or ball 9 will at once indicate how much butter there is in the supply chamber or reservoir 4.

Instead of having the rod 7 attached to the weight, a chain such as shown at 7' in Figure 6 may be used, and which would normally lie curled up on top of the weight when the weight was in the upper position, but this would require a lifting of the ring 9' to draw out the chain occasionally in order to find out how much butter there was in the supply chamber.

Having thus described my improved butter cutter, it will be seen to be a device in which the butter may be kept in proper shape for cutting a very long time, and one which is very simple while realizing the full advantages above enumerated, and while I have shown the preferred form of my invention, it is manifest that many minor changes may be made within the spirit of the invention and scope of the appended claims.

I therefore claim:

1. A butter cutter comprising a receptacle provided with means for holding it elevated from a shelf or table to provide a space for a butter saucer below the receptacle, a vertically disposed chute within the receptacle adapted to guide a block of butter downward, and a horizontally slidable blade at the lower end of said channel arranged and adapted for cutting slabs of butter from the lower end of said block, and a pivotally mounted stop plate arranged to impinge the final end of the cut slab and swing it downward from the lower side of said blade to eject the cut slab.

2. A butter cutter comprising a receptacle provided with a gravity chute for guiding a block of butter downwardly, a cutting blade arranged adjacent the lower end of said chute for cutting slabs of butter from the block, a guiding frame in which said blade is movably mounted, means for operating said blade, and quickly detachable means for holding said frame adjacent the lower end of said chute.

3. In a butter cutter as specified in claim 1, electrically heating means arranged for slightly warming said stop plate.

MARVIN A. BERG.